(12) United States Patent
Pasteuning

(10) Patent No.: US 9,903,345 B2
(45) Date of Patent: Feb. 27, 2018

(54) WIND TURBINE WITH OIL LUBRICATION

(75) Inventor: Jan Willem Pasteuning, Hilversum (NL)

(73) Assignee: XEMC DARWIND B.V., Hilversum (NL)

( * ) Notice: Subject to any disclaimer, the term of this patent is extended or adjusted under 35 U.S.C. 154(b) by 947 days.

(21) Appl. No.: 13/825,012

(22) PCT Filed: Sep. 16, 2011

(86) PCT No.: PCT/EP2011/066059
§ 371 (c)(1),
(2), (4) Date: Jun. 17, 2013

(87) PCT Pub. No.: WO2012/038327
PCT Pub. Date: Mar. 29, 2012

(65) Prior Publication Data
US 2013/0280039 A1    Oct. 24, 2013

(30) Foreign Application Priority Data
Sep. 21, 2010  (EP) .................................. 10177800

(51) Int. Cl.
*F03D 80/70* (2016.01)
*F16C 33/66* (2006.01)
(Continued)

(52) U.S. Cl.
CPC .......... *F03D 11/0008* (2013.01); *F03D 80/70* (2016.05); *F16C 33/6659* (2013.01);
(Continued)

(58) Field of Classification Search
CPC .. F05B 2260/98; F16C 33/66; F16C 33/6637; F16C 33/6659; F16C 33/6677; F16C 33/6685; F16N 7/40
(Continued)

(56) References Cited

U.S. PATENT DOCUMENTS 4,503,673 A * 3/1985 Schachle ................... F03D 7/04
290/44
4,629,033 A   12/1986 Moore
(Continued)

FOREIGN PATENT DOCUMENTS

CA   2669050 A1   2/2010
DE   19808386 A1   9/1999
(Continued)

OTHER PUBLICATIONS

European Search Report and Written Opinion of the European Patent Office Patent Office in counterpart foreign application No. PCT/EP2011/066059 filed Sep. 16, 2011.
(Continued)

*Primary Examiner* — Gregory Anderson
*Assistant Examiner* — Jason Davis
(74) *Attorney, Agent, or Firm* — Steven M. Koehler; Westman, Champlin & Koehler, P.A.

(57) ABSTRACT

Lubrication method and wind turbine comprising a rotor with a hub supported by a main bearing with two opposite bearing races coaxially spaced by rotatably fitted bearing rollers in a lubrication area which is sealed by oil sealing rings between the bearing races. The lubrication area comprises one or more oil inlets operatively connected to an oil supply, and one or more oil outlets. The vertical distance between the outlet(s) and the lowest point of the lubrication area is 0-0.2 times the inner diameter of the outer bearing race. The inlet(s) and the oil supply are configured to supply an oil flow not exceeding the drain capacity of the one or more outlets.

16 Claims, 4 Drawing Sheets

(51) Int. Cl.
*F16N 7/40* (2006.01)
*F03D 11/00* (2006.01)
*F01M 1/12* (2006.01)

(52) U.S. Cl.
CPC ......... *F16N 7/40* (2013.01); *F01M 2001/123* (2013.01); *F05B 2220/7066* (2013.01); *F05B 2260/603* (2013.01); *F16C 2360/31* (2013.01); *F16N 2210/025* (2013.01); *F16N 2210/14* (2013.01); *F16N 2260/20* (2013.01); *Y02E 10/722* (2013.01); *Y02E 10/725* (2013.01)

(58) Field of Classification Search
USPC .............................. 415/146 A, 175; 416/229
See application file for complete search history.

(56) References Cited

U.S. PATENT DOCUMENTS

| | | | |
|---|---|---|---|
| 2002/0166317 A1 | 11/2002 | Przytulski | |
| 2004/0041409 A1 | 3/2004 | Gabrys | |
| 2005/0034925 A1* | 2/2005 | Flamang | F16H 57/0402 |
| | | | 184/6.12 |
| 2009/0050410 A1* | 2/2009 | Berberich | F01D 11/003 |
| | | | 184/6.11 |
| 2010/0294597 A1* | 11/2010 | Parnin | F01D 25/18 |
| | | | 184/6.1 |
| 2011/0222804 A1 | 9/2011 | Okano | |

FOREIGN PATENT DOCUMENTS

| | | |
|---|---|---|
| EP | 1710432 | 9/2000 |
| EP | 1255024 A2 | 11/2002 |
| EP | 2570663 A2 | 3/2013 |
| GB | 1152187 A | 5/1969 |
| JP | 57011367 U | 1/1982 |
| JP | 58007925 U | 1/1983 |
| JP | 60159498 A | 8/1985 |
| JP | 2005207264 A | 8/2005 |
| JP | 2009138578 A | 6/2009 |
| WO | 03031812 A1 | 4/2003 |
| WO | WO 03029671 A1 | 4/2003 |

OTHER PUBLICATIONS

Office Action for European patent application No. 11758460.7, dated Sep. 13, 2016.

* cited by examiner

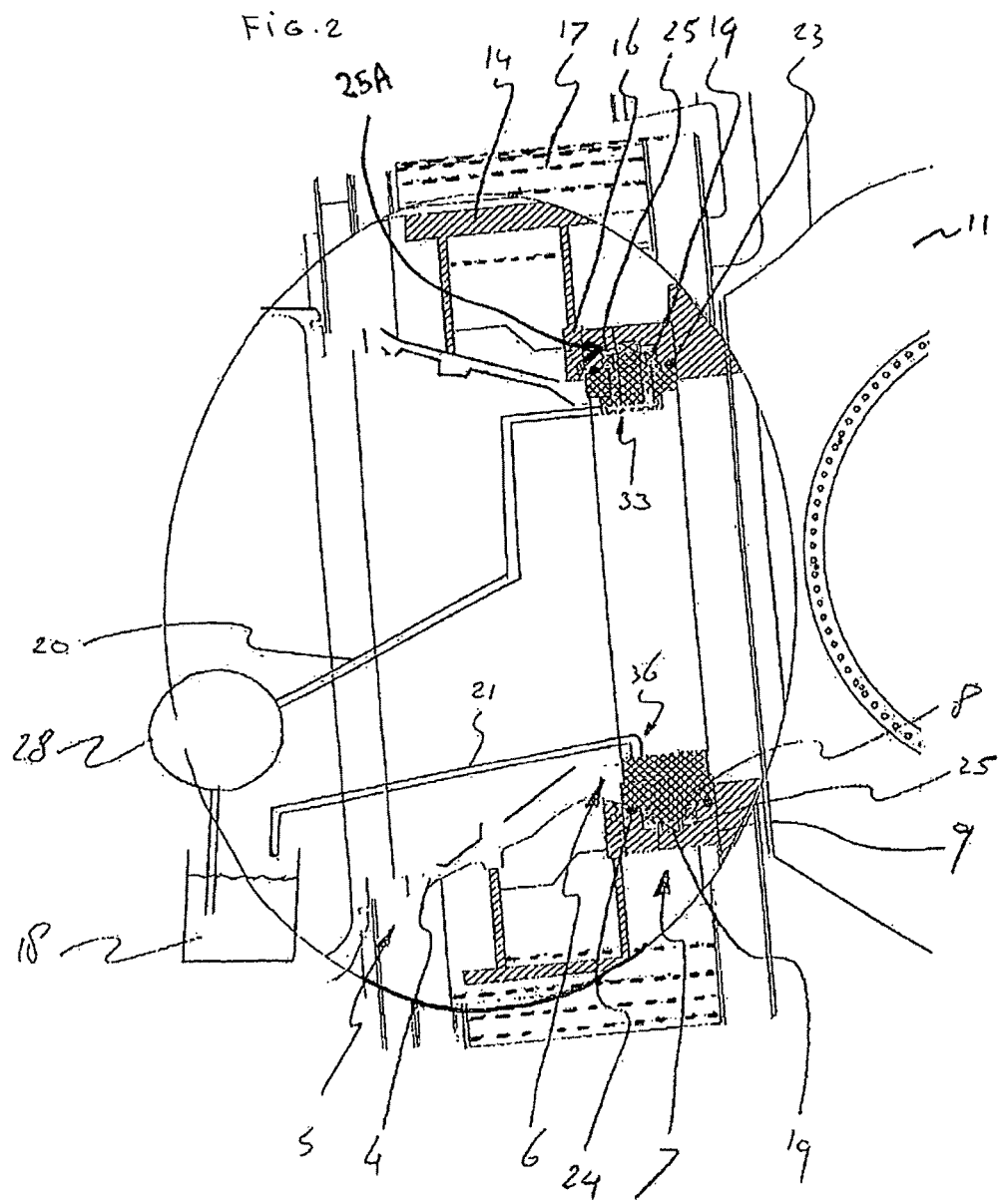

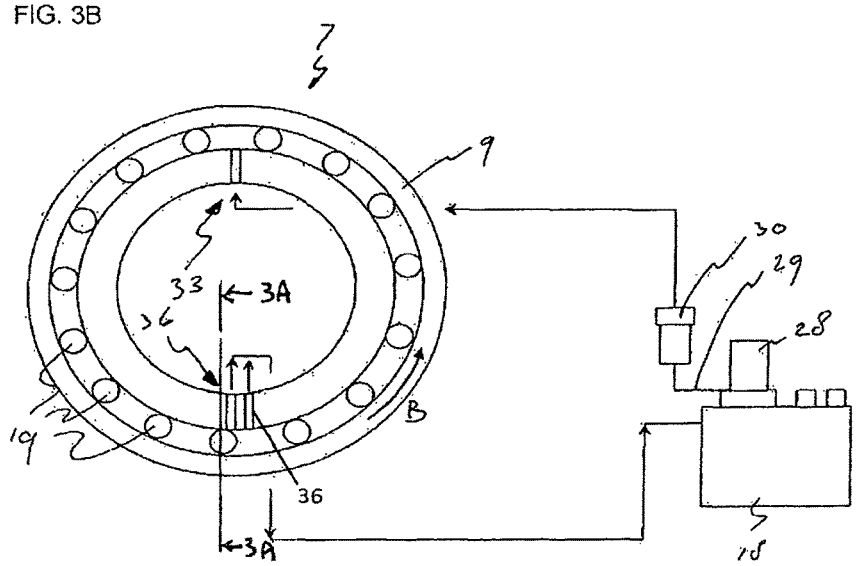
FIG. 3B
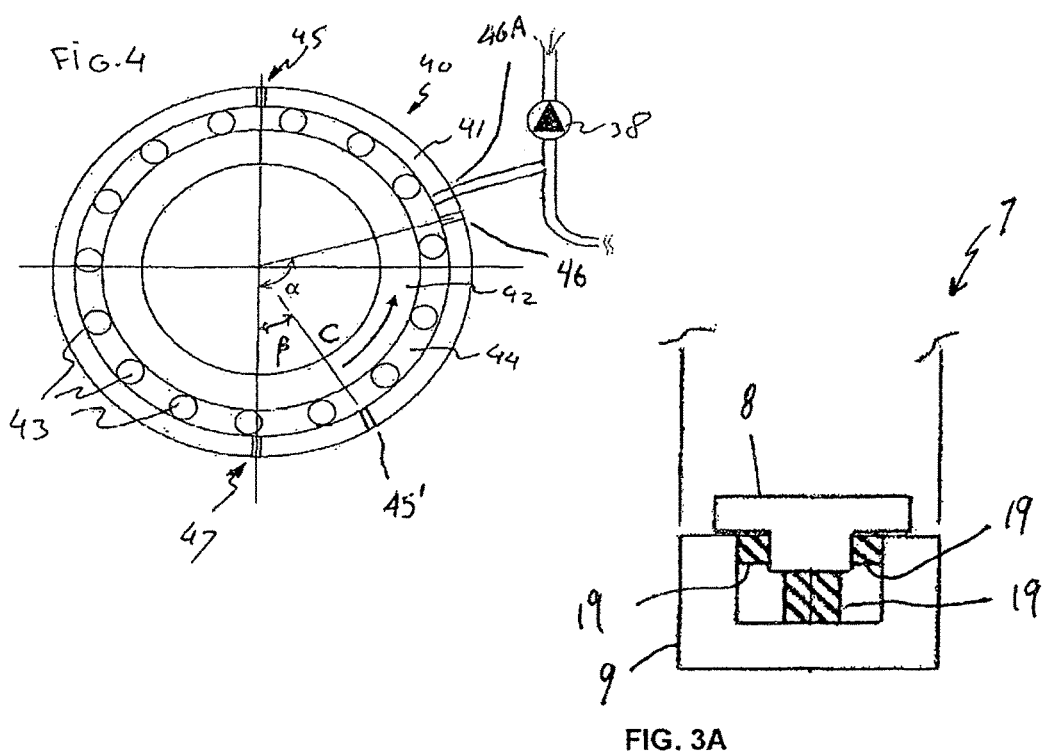
FIG. 4
FIG. 3A

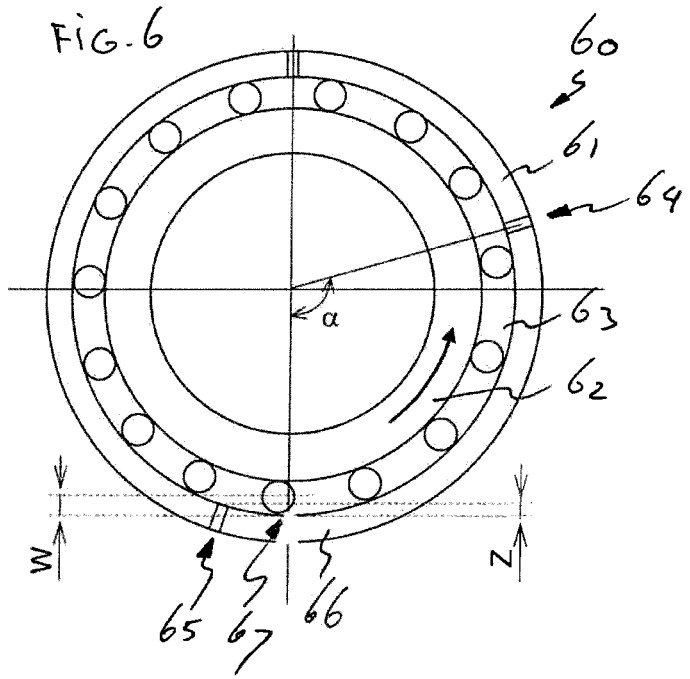
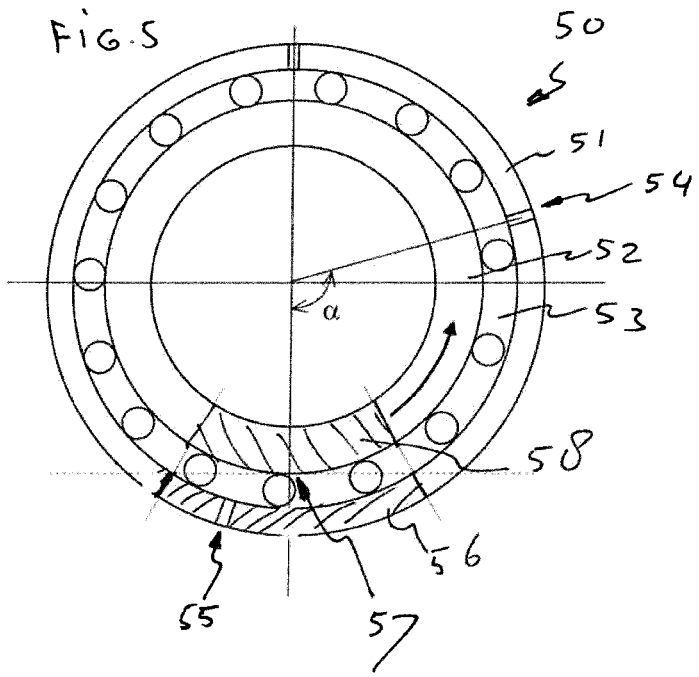

WIND TURBINE WITH OIL LUBRICATION

The present invention relates to a wind turbine and to a lubrication method for such a wind turbine. The wind turbine comprises a rotor with a hub supported by a main bearing with a rotational bearing race connected to the hub, a stationary bearing race, and a lubrication area between the two bearing races which lubrication area is sealed by oil sealing rings between the bearing races. The lubrication system and method according to the invention are particularly useful for wind turbines of the direct drive type with a gearless connection between the rotor hub and the rotating part of the generator.

Direct drive wind turbines can be provided with a single main bearing to carry the generator rotor as well as the assembly of the rotor with hub and rotor blades. These main bearings are generally very large. For lubrication of wind turbine bearings lubrication greases are typically used rather than lubrication oils to reduce losses by leakage, although oil generally gives better lubrication resulting in longer life times, removes dirt more effectively and improves heat dissipation.

EP 1 710 432 A1 discloses a gearless direct drive wind turbine where the rotor is fully carried by a main bearing. The main bearing is provided with an oil lubrication system with oil inlet and outlet channels arranged in such a way that a desired amount of oil is always present in the lubrication area intended to guarantee a back-up by passive splash lubrication in case of failure by the lubrication oil pump. The created oil reservoir forms an oil column building up pressure under its own weight to such extent that the risk of leakage is substantially increased. Additionally, substantial amounts of dirt will be collected at the lowest point of the lubrication area, forming a potential cause of damage to the bearing races or bearing rollers.

It is an object of the invention to provide an oil lubrication system for a main bearing in a wind turbine, particularly for direct drive type wind turbines, with less possible leakage mechanisms of lubrication oil.

The object of the invention is achieved with a wind turbine comprising a rotor with a hub supported by a main bearing with two opposite bearing races coaxially spaced by rotatably fitted bearing rollers, in a lubrication area sealed by oil sealing rings between the bearing races, wherein the lubrication area comprises one or more oil inlets operatively connected to an oil supply, and one or more oil outlets, the vertical distance between at least one of the outlets and the lowest point of the lubrication area being 0-0.2 times the inner diameter of the outer bearing race, wherein the one or more inlets and the oil supply are configured to supply an oil flow through the lubrication area by gravity not exceeding the drain capacity of the one or more outlets. This way, no permanent oil volume is left within the lubrication area. As a result, pressure on the oil sealing rings is minimized resulting in substantially less leakage.

In this respect, an oil flow is a flow of oil in a continuous phase. The oil is not sprayed.

The one or more outlets are positioned in such a way, that dry sump circulation lubrication can be obtained over the full lubrication area by pumping. The outlet can be arranged and configured to substantially maximize outflow of the lubricant oil by gravity, e.g., at or near the lowest point of the outer or inner bearing race. For instance, in case the outer bearing race is stationary, the outlet can be positioned in a bottom region of the outer bearing race below the lowest point of the inner race, or—if the inner bearing race is stationary—the outlet can be positioned in the inner race in a region radially opposite to said bottom region of the outer race.

The two bearing races include an inner bearing race and an outer bearing race which are coaxially spaced by the bearing rollers. Generally, one of the bearing races will be stationary while the other bearing race is rotatable. The one or more outlets will be located in the stationary bearing race, which can either be the inner or the outer bearing race. The bearing rollers can for instance comprise cylindrical and/or conical elements.

Lubrication can take place by circulation lubrication by pumping since splash lubrication capability is lost. The supply of oil via the one or more inlets can for example be continuous or intermittent. For a bearing typically sized for a multi-MW direct drive wind turbine, an oil flow of about 5 l/min will generally give sufficient lubrication. This flow might be doubled or tripled to provide extra robustness or cooling.

In a part of the lubrication area the oil will flow freely with the sense of rotation of the rotational bearing race while in the rest of the lubrication area gravity will force the oil to flow against the sense of rotation of the rotational bearing race. To improve uniform oil distribution over the entire lubrication area, at least one of the one or more inlets can be positioned less than 180°, e.g., less than 90°, behind the lowest point of the lubrication area, in the sense of rotation of the rotational bearing race.

In order to further reduce the risk of leakage, the lubrication area can be provided with an air suction pump arranged to provide a sub-atmospheric air pressure in the lubrication area. The pressure can for example be maintained at a level of $-5.10^4$--$10^3$ Pa (gauge) to compensate for capillary effects in the seal and possible pressure by oil collected below the lowest outlet. This effectively reduces leakage, e.g., caused by minor damage or wear of the bearing seals and helps to reduce maintenance costs.

In a specific embodiment, the outlet can be connected to a discharge line leading to an oil reservoir, which is in turn connected to a supply leading to the inlet, wherein a pump is arranged to circulate oil via a circuit formed by the bearing, the outlet, the discharge line, the reservoir, the supply line and the inlet. One or more filter units can be arranged within this circuit to remove dirt and contaminations.

During normal operational conditions the volume of the oil in the oil reservoir can for example be twice or more the amount of oil staying behind in the bearing, for instance by adhesion, and in the discharge and supply lines. To compensate for oil needed during start-up due to empty discharge lines or losses due to filter replacement, larger amounts of oil can be used in the reservoir. For a regular multi-MW direct drive turbine, the amount of oil in the reservoir can for instance be about 20-50 liter or more, if so desired.

Alternatively, one or more redundant lubrication systems can be present. For instance, two systems can be powered simultaneously, regardless whether or not one of the lubrication systems is out of order. Optionally, a third lubrication system can be present, e.g., activatable by an autonomous power supply which is not interrupted by complete system failure or electrical grid outage. Such a system can be used to provide survival lubrication, typically about 1-5 liter per hour, to the wind turbine on standby.

With the lubrication system according to the present invention, oil accumulation at the bottom of the lubrication area can effectively be prevented by letting the oil flow through the one or more oil inlets be less than the maximum total drain capacity of the joint outlet openings. To this end, the total accumulated opening area of the inlet (s) can for instance be less than the total accumulated through-flow opening area of the outlet(s). Alternatively, if adjustable inlet(s) and/or outlet (s) are used, the one or more inlets and/or the one or more outlet(s) can be controlled such that the oil flow through the oil inlet (s) is less than the maximum total drain capacity of the outlet(s).

With the lubrication system of the wind turbine according to the present invention, oil can be discharged via the one or more outlets by gravity. No pump is needed at the outlet, although one or more pumps can be used, if so desired. If a discharge pump is used, it can for instance be arranged between the outlet and a possibly used oil reservoir. The number of pumps in the lubrication system can be minimized, e.g., only a single pump to provide an oil flow towards the oil inlet.

The oil seal rings can for example be contact sealing rings, such as lip seals. The sealing rings can for example be made of a rubber or elastomeric material.

As horizontal axis wind turbines generally have their rotors tilted at an angle of 0-5 degrees or more, the bearing will generally be arranged substantially vertically under a similar tilting angle with the vertical. With wind turbines having a tilted horizontal axis, the vertical distance between the outlet (s) and the lowest point of the bearing race, as meant with the present invention, is the distance in the direction of the correspondingly tilted vertical.

The present invention will be elucidated with reference to the figures wherein:

FIG. 1: shows schematically a wind turbine according to the present invention, partly in cross section;

FIG. 2: shows in cross section the main bearing of the wind turbine of FIG. 1;

FIG. 3A is a schematic representation of a lower portion of the main bearing.

FIG. 3B is a cross-sectional view of the complete bearing taken along lines 3B-3B in a lower portion of the bearing in FIG. 3A.

Figure 1:
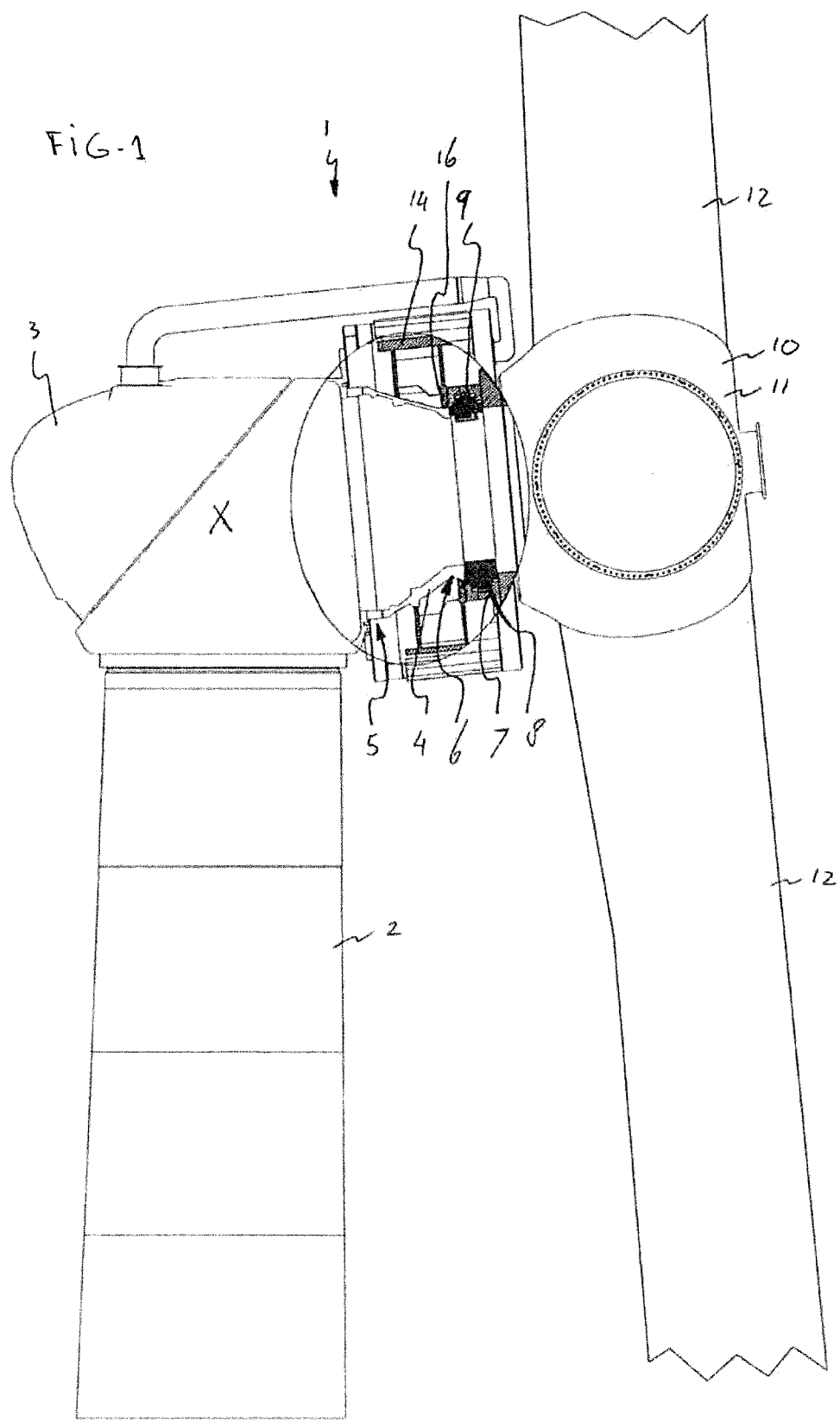

FIG. 4: shows schematically an alternative arrangement of a wind turbine bearing with a lubrication system according to the present invention.

FIG. 5 shows schematically a first embodiment of a main bearing having an oil outlet positioned in a bottom region of an outer bearing race below a lowest point of an inner bearing race.

FIG. 6 shows schematically a second embodiment of a main bearing having an oil outlet positioned in a bottom region.

FIG. 1 shows the upper part of a wind turbine 1 with a tower 2 and a nacelle 3 on top of the tower 2. A conical ring 4 comprises one side 5 with a larger diameter where it is attached to the nacelle 3 and another side 6 with a smaller diameter where it is attached to a main bearing 7 with a stationary inner race 8 and a rotary outer race 9 (see FIG. 2). A rotor 10, comprising a hub 11 with blades 12, is attached to the rotary race 9 of the main bearing 7 and can rotate around a central axis X. A generator rotor 14 with permanent magnets is attached via a flange 16 to the rotary race 9 of the main bearing 7 and is directly driven by the rotor 10 without gear transmission. A stator 17 with electro-conductive windings is mounted onto the conical ring 4. The permanent magnets on the rotor 14 rotate along the windings of the stator 17 to induce electric current through the windings. The nacelle 3 can rotate around a vertical axis to yaw the rotor 10 towards the wind.

The main bearing 7 is located between the conical ring 4 and the rotor 10 and is designed to absorb the gravitational and aerodynamic loads on the rotor 10.

In FIG. 2 the bearing comprises cylindrical elements 19, but other suitable types of rollers can also be used. Oil seal rings 23, 24 seal the gap 25A between the outer race 9 and the inner race 8. The volume of the gap 25A forms a lubrication area 25.

A lubrication unit comprising an oil reservoir 18 is arranged within the nacelle to provide lubrication for the main bearing 7. A pump 28 pumps oil from the oil reservoir 18 via a supply line 20 to an oil inlet 33 in the lubrication area 25. A return channel 21 leads from an outlet 36 in the lubrication area 25 back to the oil reservoir 18. The outlet 36 is near the lowest point of the lubrication area 25.

FIG. 3B shows schematically the lubrication system of the main bearing 7 of the wind turbine 1. The rotary outer race 9 of the main bearing 7 rotates in a direction indicated by "B" in the drawing. The oil reservoir 18 comprises a pump unit 28. A supply line 29 leads from the oil reservoir 18 to a filter unit 30 and from the filter unit 30 to an oil inlet 33 arranged in the stationary inner race 8 of the main bearing 7. The inner race 8 of the main bearing 7 is further provided with an oil outlet 36 at or near the lowest point of the inner race 8. The oil inlet 33 is located at the highest point of the lubrication area 25 of the main bearing 7. The oil flowing from the inlet 33 flows under gravity to the outlet 36.

FIG. 4 shows schematically an alternative arrangement of a bearing 40 of a wind turbine of the gearless direct drive type. The bearing 40 comprises a stationary outer bearing race 41 and a rotating inner race 42, concentrically spaced by roller elements 43. The space between the inner and outer bearing races defines a lubrication area 44, sealed at both axial sides by oil seals (not shown). The outer bearing race 41 comprises a first oil inlet 45, and a second inlet 46 at a lower level than the first oil inlet 45. The outer bearing race 41 further comprises an oil outlet 47 at the lowest point of the lubrication area 44, which is arranged and shaped to maximize the amount of oil drained from the system.

The second oil inlet 46 is positioned at an angle $\alpha$ behind the outlet 47, in sense of rotation (arrow C in the drawing) of the rotational inner bearing race 42. In this particular embodiment, the angle $\alpha$ is less than 100°. Part of the oil flowing from the second inlet 46 flows under gravity via the shortest way to the outlet 47 in a direction opposite to the rotary direction of the inner bearing race 42. Another part of the oil rotates with the rotating inner bearing race 42 and flows the longer way to the outlet 47. Due to the positioning of the second oil inlet 46, the part of the lubrication area 44 between inlets 45 and 46 is sufficiently lubricated. In the other part of the lubrication area 44 oil flows by gravity in a direction opposite to the rotary direction of the inner bearing race 42 and is lubricated to more or less the same extent as the part where the oil flows in a direction coinciding with the direction of rotation of the rotary inner bearing race 42. An oil inlet 45' is provided in one embodiment and is positioned at an angle $\beta$ less than 90 degrees behind the lowest point of the lubrication area 25.

The oil outlet 47 is arranged at or near the lowest point of the lubrication area 44 and is operatively connected to an oil discharge line (not shown) returning the oil to an oil reservoir. The capacity of the oil outlet 47 is larger than the joint capacity of both oil inlets 45, 46. This way, accumulation of oil, a driving force for leakage, is prevented.

In the lubrication area 44 oil flows from the inlets 45, 46 to the oil outlet 47 at or near the lowest point of the lubrication area. Under gravity, it flows unsprayed via the oil outlet 47 back to the oil reservoir, where it is recirculated by a pump unit via a filter and the inlets back into the lubrication area 44 in a manner similar to the system shown in FIGS. 1-3.

The lubrication area 44 of the main bearing 7 is further operatively connected to an air suction pump 38 configured to provide a subatmospheric air pressure in the lubrication area 44 via passageway 46A.

In the disclosed embodiments the (lowest) outlet is arranged and configured to maximize outflow of the lubricant oil by gravity to avoid accumulation of lubrication oil at the bottom of the lubrication area. This can be achieved by positioning the outlet at or near the lowest point of the stationary bearing race, which can be the inner bearing race or the outer bearing race. Oil accumulation can also be avoided if the outlet is only at a short distance from the lowest point of the lubrication area, as is shown in FIGS. 5 and 6.

FIG. 5 shows a main bearing 50 of a direct drive multi-MW wind turbine with a stationary outer bearing race 51 and a rotational inner bearing race 52. Between the bearing races 51, 52 is an annular lubrication area 53 with oil inlets 54 and an oil outlet 55. The oil outlet 55 is positioned in a bottom region 56 of the outer bearing race 51 below the lowest point 57 of the inner bearing race 52. Alternatively, if in such a configuration the inner bearing race 52 would be the stationary race, the outlet can be positioned in the inner bearing race 52 in a region 58 radially opposite to said bottom region 56 of the outer bearing race 51.

FIG. 6 shows a main bearing 60 of a direct drive multi-MW wind turbine with a stationary outer bearing race 61 and a rotational inner bearing race 62. Between the bearing races 61, 62 is an annular lubrication area 63 with an oil inlet 64 and an oil outlet 65. The oil outlet 65 is positioned in a bottom region 66 of the outer bearing race 61. The vertical distance Z between the outlet 65 and the lowest point 67 of the lubrication area is at most a distance W corresponding to half the radial width of the lubrication area 63.

An independent second or additional lubrication system can be present in case the lubrication system fails. Optionally, other types of redundant fall-back systems, such as systems running on autonomous power supply, can also be used.

The invention claimed is:

1. A gearless direct drive wind turbine comprising a rotor with a hub supported by a main bearing with two opposite bearing races, one of which is rotational and one of which is stationary, the bearing races comprising an inner bearing race and an outer bearing race coaxially spaced by rotatably fitted bearing rollers in a lubrication area which is sealed by oil sealing rings between the bearing races, the oil sealing rings being positioned at two axial ends of the lubrication area,
wherein the lubrication area comprises one or more oil inlets operatively connected to an oil supply, and one or more oil outlets,
wherein the one or more oil inlets and the oil supply are configured to supply an oil flow through the lubrication area by gravity not exceeding a drain capacity of the one or more oil outlets,
wherein one of said one or more oil outlets is positioned at a lowest point of the stationary bearing race opposite to a bottom region of the rotation bearing race,
the wind turbine further comprising a pump circuit operatively connected to the one oil outlet positioned at the lowest point to recycle oil therefrom and configured to pump said oil to the one or more oil inlets to provide continuous circulation flow through the full lubrication area from the one or more oil inlets to the one or more oil outlets.

2. The wind turbine according to claim 1 wherein the outer bearing race is stationary and at least one of the one or more oil outlets is positioned in a bottom region of the outer bearing race below a lowest point of the inner bearing race, or wherein the inner bearing race is stationary and at least one of the one of more oil outlets is positioned in the inner bearing race in a region radially opposite to said bottom region of the outer bearing race.

3. The wind turbine according to claim 1 wherein one of the one or more oil outlets is positioned at the lowest point of the outer or inner bearing race.

4. The wind turbine according to claim 1 wherein the outer bearing ring is stationary and a vertical distance between at least one of the one or more oil outlets and the lowest point of the lubrication area is at most half a radial width of the lubrication area.

5. The wind turbine according to claim 1, wherein with respect to rotation of the rotational bearing race at least one of the one or more oil inlets is positioned less than 180° behind a lowest point of the lubrication area.

6. The wind turbine according to claim 1, and further comprising one or more suction pumps fluidly connected to the lubrication area, wherein the lubrication area comprises one or more suction openings at a distance from the one or more oil outlets, which said one or more suction openings communicate with said one or more suction pumps to provide a sub-atmospheric air pressure in the lubrication area.

7. The wind turbine according to claim 1 wherein the pump circuit includes a pump and an oil reservoir, and wherein one or more oil outlets are connected to a discharge line leading to the oil reservoir, which is in turn connected to a supply line leading to the one or more oil inlets, wherein the pump is arranged to circulate oil via the pump circuit formed by the bearing, the one or more oil outlets, the discharge line, the oil reservoir, the supply line and the one or more oil inlets.

8. The wind turbine according to claim 7 and further comprising at least one filter fluidly connected in the pump circuit.

9. The wind turbine according to claim 1 wherein the inner bearing race is stationary and the one or more oil outlets are arranged in the stationary inner bearing race.

10. The wind turbine according to claim 1 wherein the outer bearing race is stationary and the one or more oil outlets are arranged in the stationary outer bearing race.

11. The wind turbine according to claim 1, wherein with respect to rotation of the rotational bearing race at least one of the one or more oil inlets is positioned less than 90 degrees behind the lowest point of the stationary bearing.

12. A method of lubricating a main bearing of a wind turbine comprising:
supporting a rotor with a hub by a main bearing with two opposite bearing races, one of which is rotational and one of which is stationary, coaxially spaced by rotatably fitted bearing rollers in a lubrication area sealed by oil sealing rings between the bearing races, the oil sealing rings being positioned at two axial end of the lubrication area, and
lubricating the lubrication area by controlling oil running from one or more oil inlets to one or more oil outlets, wherein one of the one or more oil outlets is positioned at a lowest point of the stationary bearing race opposite to a bottom region of the rotational bearing race, wherein oil flow from the one or more oil inlets does not exceed a drain capacity of the one or more oil outlets, and circulating oil discharged from the one of the one or more oil outlets at the lowest point of the stationary bearing to the one or more oil inlets to provide a continuous circulation flow through the full lubrication area from the one or more oil inlets to the one or more oil outlets.

13. The method according to claim 12 wherein lubricating comprises creating sub-atmospheric air pressure in the lubrication area.

14. The method according to claim 12, wherein circulating comprises pumping the oil from the one or more oil outlets to the one or more oil inlets.

15. The method according to claim 14 and further comprising filtering the oil before providing the oil to the one or more oil inlets.

16. The method according to claim 12, further wherein pumping comprises using a direct connection of a pump intake to the one or more oil outlets of the lubrication area.

* * * * *